United States Patent
Li et al.

(10) Patent No.: US 10,804,526 B2
(45) Date of Patent: Oct. 13, 2020

(54) ELECTRODE MEMBER, ELECTRODE ASSEMBLY AND RECHARGEABLE BATTERY

(71) Applicant: CONTEMPORARY AMPEREX TECHNOLOGY CO., LIMITED, Ningde (CN)

(72) Inventors: Xiang Li, Ningde (CN); Chengyou Xing, Ningde (CN); Peng Wang, Ningde (CN); Rulai Cai, Ningde (CN)

(73) Assignee: CONTEMPORARY AMPEREX TECHOLOGY CO., LIMITED, Ningde (CN)

( * ) Notice: Subject to any disclaimer, the term of this patent is extended or adjusted under 35 U.S.C. 154(b) by 225 days.

(21) Appl. No.: 15/971,642

(22) Filed: May 4, 2018

(65) Prior Publication Data

US 2019/0157656 A1    May 23, 2019

(30) Foreign Application Priority Data

Nov. 22, 2017   (CN) .......................... 2017 1 1172398

(51) Int. Cl.
*H01M 4/72*       (2006.01)
*H01M 4/13*       (2010.01)
*H01M 10/0525*    (2010.01)
*H01M 4/66*       (2006.01)
(Continued)

(52) U.S. Cl.
CPC ............. *H01M 4/13* (2013.01); *H01M 2/266* (2013.01); *H01M 4/667* (2013.01); *H01M 4/70* (2013.01); *H01M 10/0525* (2013.01)

(58) Field of Classification Search
CPC .......... H01M 4/13; H01M 4/667; H01M 4/70; H01M 10/0525; H01M 2/266
See application file for complete search history.

(56) References Cited

U.S. PATENT DOCUMENTS

2005/0233209 A1   10/2005   Sudano et al.
2012/0315537 A1   12/2012   Ravdel et al.

FOREIGN PATENT DOCUMENTS

| CN | 203423225 U | 2/2014 |
|----|-------------|--------|
| JP | 1167221 A   | 3/1999 |
| JP | 10241699 A  | 4/1999 |

(Continued)

OTHER PUBLICATIONS

Office Action from corresponding Japanese Application No. 2018-063581 and machine translation, dated Nov. 26, 2019, 5 pages.

(Continued)

*Primary Examiner* — Jane J Rhee
(74) *Attorney, Agent, or Firm* — Tucker Ellis LLP (57) ABSTRACT

The present invention relates to the technical field of rechargeable batteries and, in particular, to an electrode member, an electrode assembly and a rechargeable battery. The electrode member of the present invention includes an electrode body. The electrode body includes an insulating base and a conductive layer disposed on a surface of the insulating base. The conductive layer has a first portion and a second portion extending from the first portion, the first portion is adapted to be coated with an active material and the second portion is uncoated with the active material. A portion of the insulating base corresponding to the second portion is provided with a first through-hole throughout a thickness direction.

20 Claims, 5 Drawing Sheets

(51) Int. Cl.
*H01M 2/26* (2006.01)
*H01M 4/70* (2006.01)

(56) References Cited

FOREIGN PATENT DOCUMENTS

| | | | |
|---|---|---|---|
| JP | 2003282064 A | 10/2003 |
| JP | 2012129114 A | 7/2012 |

OTHER PUBLICATIONS

Extended European Search Report from corresponding European Application No. 18169335.9 dated Jun. 29, 2018.
Office Action from corresponding European Application No. 18169335.9 dated May 24, 2019.
Office Action from corresponding Japanese Application No. 2018-063581.

ELECTRODE MEMBER, ELECTRODE ASSEMBLY AND RECHARGEABLE BATTERY

CROSS-REFERENCE TO RELATED INVENTIONS

The present invention claims priority to Chinese Patent Application No. 201711172398.7, filed on Nov. 22, 2017, the content of which is incorporated herein by reference in its entirety.

TECHNICAL FIELD

The present invention relates to the technical field of rechargeable batteries and, in particular, relates to an electrode member, an electrode assembly and a rechargeable battery.

BACKGROUND

As a rechargeable battery, a lithium-ion battery has the high energy density, the high power density, the high frequency of reusing, the long storage time and the like advantages, and thus has been widely used in portable electronic devices, such as mobile phones and laptops, and electric vehicles, such as electric automobiles and electric bicycles.

Electrode members of a lithium-ion battery are usually made of a metal material. For example, a positive electrode member is usually made of aluminum foil, and a negative electrode member is usually made of copper foil. However, in the nail penetration test, since the aluminum foil (the copper foil) is burred during the piercing of the nail, so that the burr directly lap on the negative electrode member (the positive electrode member), which may cause a short-circuit occurring inside the positive electrode member and the negative electrode member, thereby further resulting in catching fire or even explosion of the lithium-ion battery.

SUMMARY

Figure 1:
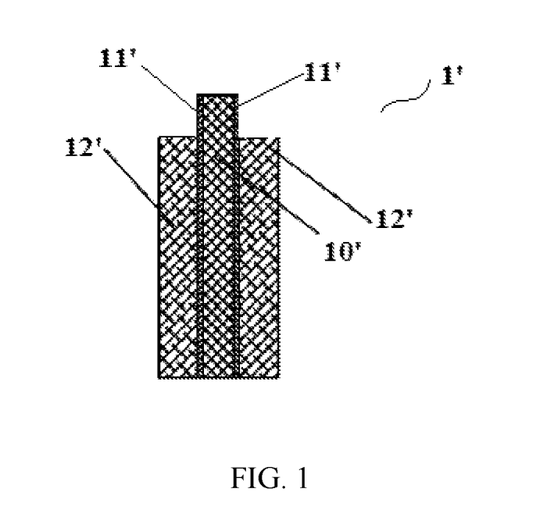
FIG. 1 illustrates a schematic structural view of an electrode member having an insulating base in the prior art.
Figure 2:
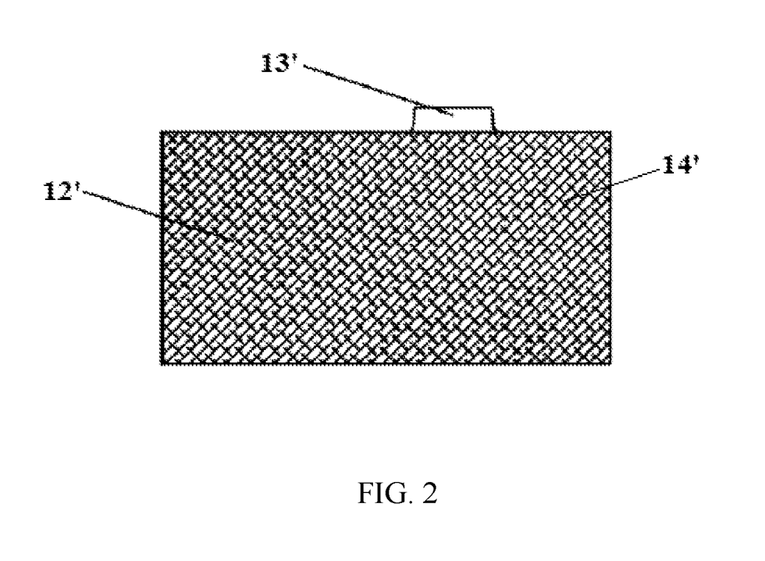
FIG. 2 illustrates a side view of FIG. 1.

In order to solve the problems in the nail penetration test, a new type of electrode member has been developed without using aluminum foil or copper foil. As shown in FIGS. 1-2, a new electrode member 1' includes an insulating base 10' and a conductive layer 11' disposed on the surface of the insulating base 10'. The conductive layer 11' has a first portion coated with an active material 12' and a second portion uncoated with the active material 12'. The second portion extends from the first portion. For simplifying the description, the first portion and a portion of the insulating base 10' corresponding to the first portion are referred as a current generating portion 14', and the second portion and another portion of the insulating base 10' corresponding to the second portion are referred as a current guiding portion 13'. In use, the active material 12' in the current generating portion 14' is electrochemically reacted with an electrolyte solution or the like to result in a charging and discharging process, and the current guiding portion 13' is connected to a current collecting member to guide the generated current outwards. Since the conductive layer 11' is disposed on the surface of the insulating base 10' and the thickness of the conductive layer 11' is much smaller than the thickness of the copper foil or the aluminum foil currently used. No burr will be generated during the use of the nail, and the nail penetration test can be safely performed.

A plurality of current guiding portions 13' can be generated by winding or stacking this new type of electrode members for forming an electrode assembly, and the plurality of current guiding portions 13' are connected to the current collecting member. However, due to the existence of the insulating base 10', conductive layers 11' between the plurality of current guiding portions 13' cannot directly contact to each other, resulting in poor conductive property (or even mutual insulation). Therefore, the excessive resistance may appear at the connection between the current guiding portions 13' and the current collecting member, resulting in a sharp rise of temperature during the charging and discharging process. In addition, the electrode member and the current collecting member are usually connected by welding (such as ultrasonic welding). As the new electrode member has the insulating base, through which it is hard for the welding energy to pass, it is difficult or even impossible to weld the electrode member with the current collecting member.

Based on the above, a technical problem to be solved by the present invention is to improve the conductivity of an electrode member having an insulating base.

In order to solve the above technical problem, an aspect of the present invention provides an electrode member including an electrode body. The electrode body further includes an insulating base and a conductive layer disposed on surface of the insulating base. The conductive layer has a first portion and a second portion extending from the first portion. The first portion is adapted to be coated with an active material and the second portion is uncoated with the active material. The portion of the insulating base corresponding to the second portion is provided with a first through-hole throughout a thickness direction.

Optionally, the first through-hole is filled with a conductive medium.

Optionally, there are at least two first through-holes provided, which are arranged in rows and/or in columns.

Optionally, the second portion has a thickness in a range of 1 nm-2 μm, preferably a thickness in a range of 500 nm-1000 nm.

Optionally, the first through-hole has a diameter in a range of 10 nm-1000 μm, preferably a diameter in a range of 25 nm-800 nm.

Optionally, the second portion is provided with a through-hole throughout the thickness direction, and the second through-hole corresponds to and communicates with the first through-hole.

Optionally, the electrode member further includes a conductive structure, and the conductive structure is connected to the second portion.

Optionally, the conductive structure covers the first through-hole.

Optionally, the conductive structure is welded with the second portion.

Optionally, the conductive layer is disposed on each of the two opposite surfaces of the insulating base. The conductive structure includes a first conductive member, and the first conductive member is connected to the second portion located on one surface of the insulating base.

Optionally, the conductive structure further includes a second conductive member, and the second conductive member is connected to the second portion located on the other surface of the insulating base.

Optionally, the conductive structure has a thickness in a range of 5 μm-20 μm, and preferably a thickness in a range of 6 μm-10 μm.

A second aspect of the present invention further provides an electrode assembly, including the electrode member according to the present invention, and the first portion is coated with the active material.

A third aspect of the present invention provides a rechargeable battery, including a current collecting member and the electrode assembly according to the present invention. The second portion of the electrode member of the electrode assembly is electrically connected to the current collecting member.

Optionally, the second portion is welded with the current collecting member.

In the present invention, with the one or more first through-holes, each of which is provided along the thickness direction in a portion of the insulating base corresponding to the second portion of the conductive layer uncoated with the active material, a current path can be formed in the first through-hole of the insulating base, thereby advantageously enhancing the conductivity of the conductive member.

Other features of the present invention, as well as advantages thereof, will be explicated in the following detailed description of exemplary embodiments of the invention with reference to the attached drawings.

BRIEF DESCRIPTION OF DRAWINGS

In order to clarify the technical solutions in the embodiments of the present invention or in the prior art, the accompanying drawings required for describing the embodiments or the prior art are briefly introduced. The accompanying drawings below only illustrate some embodiments of the present invention, and those skilled in the art may derive other drawings from these drawings without any creative effort.

REFERENCE SIGNS

1' electrode member; 10' insulating base; 11' conductive layer; 12' active material; 13' current guide portion; 14' current generating portion;

1 electrode body; 10 insulating base; 11 conductive layer; 12 active material; 13 current guide portion; 14 current generating portion;

2 conductive structure; 21a first conductive member; 21b second conductive member; 22 conductive connecting portion;

1a welding portion; 13a first through-hole; 13c second through-hole; G gap;

100 electrode assembly; 101 negative electrode member; 102 separator; 200 current collecting member; 300 top cover; 400 electrode terminal.

DESCRIPTION OF EMBODIMENTS

The technical solutions in the embodiments of the present invention are clearly and completely described below with reference to the accompanying drawings included in the embodiments of the present invention. The described embodiments are merely exemplary, rather than all of the embodiments of the present invention. The following description of at least one exemplary embodiment is merely illustrative, but not intended to limit the invention and its invention or use. All other embodiments obtained by those skilled in the art based on the embodiments of the present invention without creative efforts shall fall within the protection scope of the present invention.

Techniques, methods, and devices that are known to those skilled in the relevant art may not be discussed in detail but, where appropriate, the techniques, methods, and devices should be considered as part of the authorized specification.

In the description of the present invention, it should be understood that the terms such as "front, back, up, down, left, right", "lateral, longitudinal, vertical, horizontal" as well as "top and bottom" indicate the azimuths or positional relationships that are generally based on the orientation or positional relationships shown in the drawings for ease of description, and are intended to describe the present invention and simplify the describing. Unless indicating otherwise, it should not be understood that the devices or elements described with these terms must be disposed in specific orientations or position, and thus should not be construed as limitation on the protection scope of the present invention. The terms "inside" or "outside" refer to the inside or the outside with respect to the outline of each component.

In the description of the present invention, it should be understood that the terms "first", "second" and the like are only intended to distinguish the corresponding parts from one another. Unless indicating otherwise, these terms may not be understood as a limitation on the protection scope of the present invention.

Figure 7:
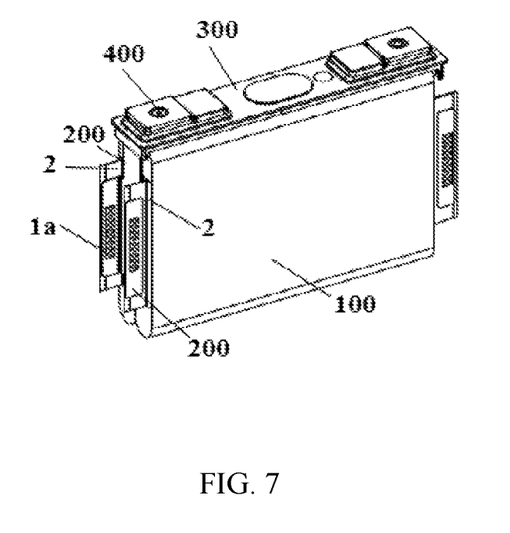
FIG. 7 illustrates a three-dimensional structural view of a battery based on FIG. 6.

For sake of understanding, the basic structure of a rechargeable battery is firstly described with reference to FIGS. 5 and 7. Referring to FIG. 7, the rechargeable battery mainly includes a case (not shown), an electrode assembly 100, a current collecting member 200, a top cover 300, and an electrode terminal 400. The case has a cavity, which has an open top and is used for receiving the electrode assembly 100 and protecting the electrode assembly 100. The electrode assembly 100 is accommodated in the case and serves as a core part of the rechargeable battery for charging and discharging functions. The top cover 300 covers the opening of the case. The electrode terminal 400 is disposed on the top cover 300 and the top surface of the electrode terminal 400 is out of the top cover 300. The current collecting member 200 is connected between the electrode assembly 100 and the electrode terminal 400 to achieve an electrical connection between the electrode assembly 100 and the electrode terminal 400.

Figure 4:
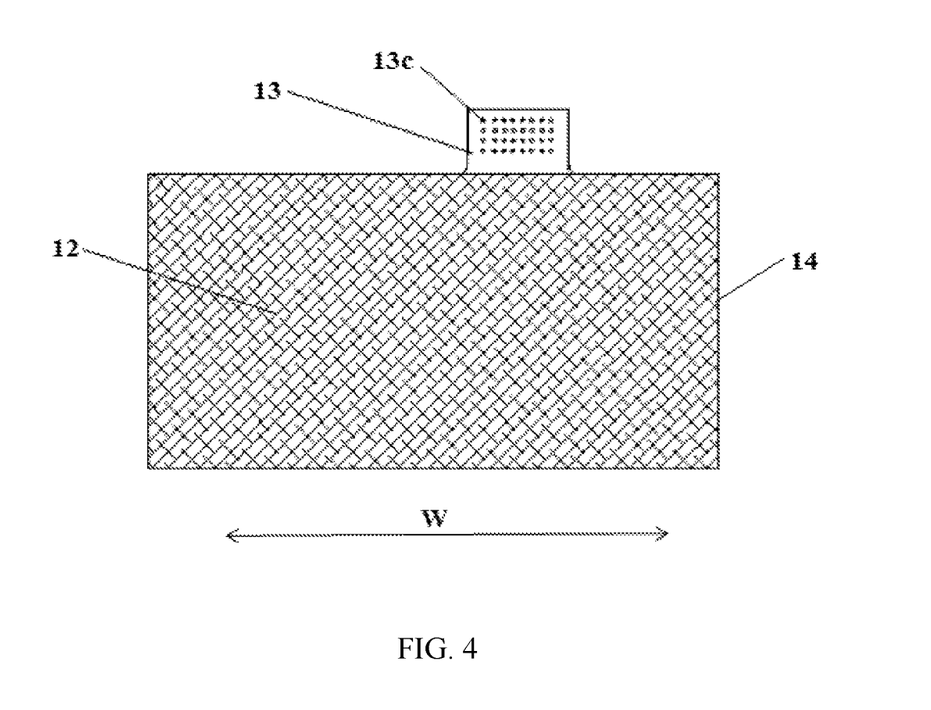
FIG. 4 illustrates a side view of FIG. 3.
Figure 5:
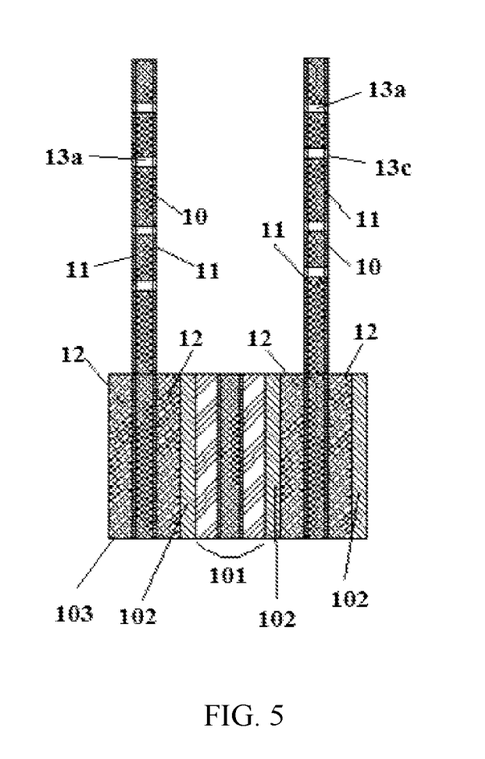
FIG. 5 illustrates a partial exploded view of an electrode assembly based on the electrode member shown in FIG. 3.

Referring to FIG. 5, the electrode assembly 100 is formed by winding or stacking a positive electrode members 103, negative electrode members 101, and separators 102 that each is disposed between one positive electrode member 103 and one negative electrode member 101. The positive electrode members 103 and the negative electrode members 101 are both generally in a sheet-like structure, and therefore are also referred as positive electrode sheets and negative electrode sheets. As shown in FIG. 4, each of the positive electrode members 103 and each of the negative electrode members 101 include a current generating portion 14 and a current guiding portion 13. The current generating portion 14 has an active material 12, while the electricity guiding portion 13 does not have the active material 12. After being winded or stacked to form the electrode assembly, a plurality of current guiding portions 13 of the same polarity are stacked together to form an electrode tab. The electrode assembly is connected to the current collecting member 200 through the electrode tab. The positive electrode members 103 correspond to a positive electrode tab. The negative electrode members 101 correspond to a negative electrode tab. An electrode terminal 400 connected to the positive electrode tab by the current collecting member 200 is referred as a positive electrode terminal. An electrode terminal 400 connected to the negative electrode tab by the current collecting member 200 is referred as a negative electrode terminal.

When the electrode members according to FIGS. 1-2, serving as the positive electrode members 103 and/or the negative electrode members 101, are wound or stacked to form the electrode assembly 100, any two adjacent current guiding portions 13 of the electrode tab of the electrode assembly 100 are separated by the insulating base 10', thereby the current is difficult or even impossible to be transferred between the adjacent current guiding portions 13 and can only be transferred outward by a conductive layer 11' of the outermost current guiding portion 13 of the electrode tab, the conductive layer 11' being directly connected to the current collecting member 200. Therefore, the conductivity as well as the charging and discharging efficiency are low, and local overheating tends to occur, which shortens the service life of respective components.

In order to solve the above-mentioned technical problems, the present invention provides a new type of electrode member by modifying the electrode member having an insulating base as shown in FIGS. 1-2.

FIGS. 3-10 show two embodiments of the present invention. Referring to FIGS. 3-10, the electrode assembly provided by the present invention includes an electrode body 1. The electrode body 1 includes an insulating base 10 and a conductive layer 11 disposed on surfaces of two opposite sides of the insulating base 10 in the thickness direction. The conductive layer 11 has a first portion and a second portion extending from the first portion. The first portion is coated with an active material 12 and the second portion is uncoated with the active material 12. The portion of the insulating base 10 corresponding to the second portion is provided with one or more first through-holes 13a throughout the thickness direction.

For simplifying the description, the first portion and a portion of the insulating base 10 corresponding to the first portion are referred as a current generating portion 14, and the second portion and a portion of the insulating base 10 corresponding to the second portion are referred as a current guiding portion 13. In other words, in the present invention, the electrode body 1 includes the current generating portion 14 and the current guiding portion 13. The current generating portion 14 and the current guiding portion 13 each includes the insulating base 10 and the conductive layer 11 disposed on the insulating base 10. The difference is in that the conductive layer 11 of the current generating portion 14 is coated with the active material 12, and the conductive layer 11 of the current guiding portion 13 is uncoated with the active material 12. The current generating portion 14 is used to achieve the charging and discharging process by the electrochemical reaction between the active material 12 and the electrolyte solution. The current guiding portion 13 is connected to the current collecting member 200 of the rechargeable battery so as to guide the current generated by the current generating portion 14 outwards.

In the present invention, by providing the first through-hole 13a throughout the thickness direction on a portion of the insulating base 10 corresponding to the second portion of the conductive layer 11 where the active material is uncoated, a current path can be formed in the insulating base 10 by providing a conductive medium in the first through-hole 13a or by performing welting, melting, etc., on the second potion on surfaces of two opposite sides of the insulating base 10. In this way, current can be transferred in the thickness direction, reducing the limitation on the conductivity of the electrode member caused by the presence of the insulating base 10. In this way, after the electrode assembly 100 is formed by winding or stacking the electrode members, adjacent current guiding portions 13 can be electrically connected, which can facilitate improving the electrical conductivity.

In addition, the present invention can also facilitate reducing the difficulty of welding the electrode member with the current collecting member 200, since the first through-holes 13a allows the welding energy to penetrate the insulating base 10 more easily. Further, since the heated second portion can flow into the first through-hole 13a during welding, the present invention can also prevent the current guiding portion 13 of the electrode member from being wrinkled by heat during welding.

The number of the first through-hole 13a can be one, two or more. When there are at least two first through-holes 13a, the at least two first through-holes 13a can be arranged in rows and/or in columns. Preferably, a plurality of first through-holes 13a can be provided on a portion of the insulating base 10 corresponding to the second portion, and the plurality of first through-holes 13a can be distributed with interval over the whole portion of the insulating base 10 corresponding to the second portion. Since the first through-holes 13a can form more current paths, which can be distributed more broadly, the conductivity can be more effectively improved.

In the present invention, the second portion can be further provided with a second through-hole 13c throughout the thickness direction, and the second through-hole 13c corresponds to and communicates with the first through-hole 13a. In this way, the second through-hole 13c and the first through-hole 13a can penetrate the entire thickness direction of the current guiding portion 13, so that the welding energy can easily penetrate the current guiding portion 13, thereby more easily and efficiently achieving the welding of the current guiding portion 13 with the current collecting member 200 and other structural components.

In addition, in the present invention, the electrode member may further include a conductive structure 2, and the conductive structure 2 is connected to the second portion. By providing the additional conductive structure 2 on the current guiding portion 13 having the insulating base 10, after the electrode assembly 100 is formed by winding or stacking the electrode members, an electrical communication between the adjacent current guiding portions 13 can be achieved not only by the current paths formed by the first through-holes 13a, but also by the conductive structure 2. Therefore, the conductivity of the electrode members can be more effectively improved.

In the present invention, the conductive layer 11 can be disposed either on one surface of the insulating base 10, or on surfaces of two opposite sides of the insulating base 10. When the conductive layer 11 is disposed on the surfaces of the two opposite sides of the insulating base 10, the conductive structure 2 can include a first conductive member 21a, which is connected to a second portion located on one side of the insulating base 10. Optionally, the conductive structure 2 can further include a second conductive member 21b, which is connected to the second portion located on the other side of the insulating base 10. The structures and materials of the first conductive member 21a and the second conductive member 21b can be the same or different. When the conductive structure 2 includes the first conductive member 21a and the second conductive member 21b, the first conductive member 21a and the second conductive member 21b can be directly connected. Alternatively, the conductive structure 2 can further include a conductive connecting portion 22, which is connected between the first conductive member 21a and the second conductive member 21b, so that the first conductive member 21a and the second conductive member 21b can be connected by the conductive connecting portion 22.

In addition, the conductive structure 2 is preferably arranged to cover the first through-hole 13a. In this way, the conductive members on two sides of the current guiding portion 13 can be connected to each other through the first through-hole 13a during the welding, thereby further improving the conductive property and enhancing the structural robustness. The conductive members located on two sides of the current guiding portion 13 can be the first conductive member 21a and the second conductive member 21b connected to two sides of the same current guiding portion 13 (in this case, the conductive structure 2 on the current guiding portion 13 includes the first conductive member 21a and the second conductive member 21b located at two sides of the current guiding portion 13). Alternatively, the conductive members located on two sides of the current guiding portion 13 can also be a first conductive member 21a on one side of one current guiding portion 13 and a first conductive member 21a one the same one side of another current guiding portion after the electrode assembly 100 is formed (in this case, the conductive structure 2 on each current guiding portion 13 only includes the first conductive member 21a located on one side of the current guiding portion 13).

The present invention will be further described with reference to the two embodiments shown in FIGS. 3-10. Both of the embodiments exemplify the electrode assembly 100 formed by winding the electrode members.

Figure 3:
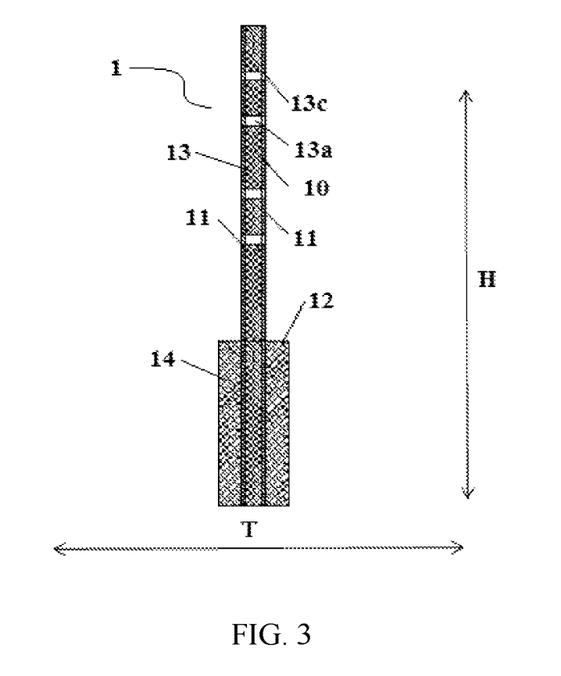
FIG. 3 illustrates a schematic structural view of an electrode member according to a first embodiment of the present invention.
Figure 6:
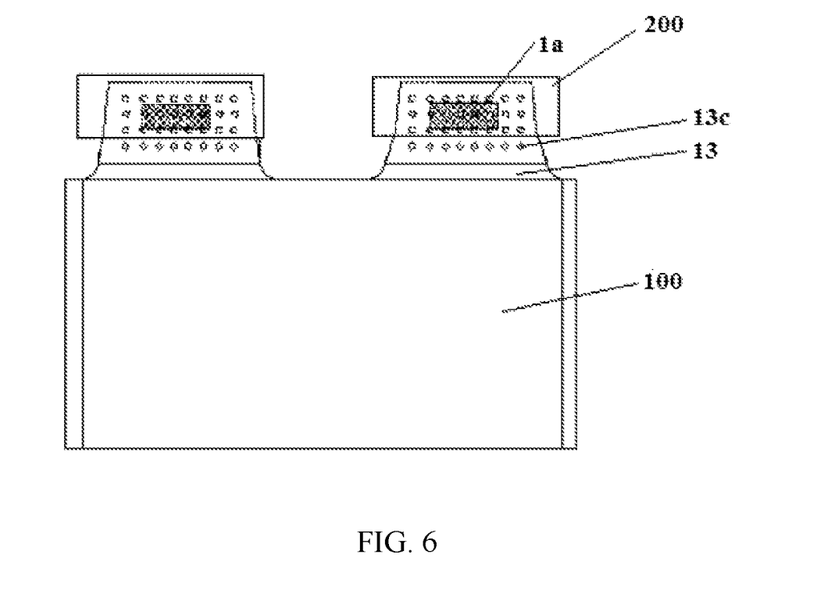
FIG. 6 illustrates a schematic view of welding the electrode assembly and the current collecting member shown in FIG. 5.

First of all, a first embodiment of the present invention will be described with reference to FIGS. 3-7. FIGS. 3 and 4 describe an electrode member according to the first embodiment of the present invention. FIGS. 5-6 and 7 describe an electrode assembly and a rechargeable battery based on the electrode member according to the first embodiment.

As the first embodiment shown in FIGS. 3 and 4, the electrode member includes an electrode body 1. The electrode body 1 includes an insulating base 10 and a conductive layer 11. The conductive layer 11 is disposed on surfaces of two opposite sides of the insulating base 10. That is, the surfaces of the two opposite sides of the insulating base 10 are both provided with the conductive layer 11, and the insulating base 10 is placed between two conductive layers 11. The conductive layer 11 has a first portion coated with an active material 12 (the lower portion in FIG. 3) and a second portion uncoated with the active material 12 (the upper portion in FIG. 3), the second portion extending from the first portion (i.e., extending upwards in FIG. 3).

The insulating base 10 can be made of a polymer material resistant to electrolyte corrosion, such as PP, PE, PET or PI. The conductive layer 11 can be a metal substrate, such as aluminum or copper substrate. Preferably, when the electrode member is used as the positive electrode member, the aluminum substrate is used as the conductive layer 11. When the electrode member is used as the negative electrode member, the copper substrate is used as the conductive layer 11. The conductive layer 11 can be processed on the surface of the insulating base 10 by plating, electrophoresis, spray coating or dip coating and the like.

For sake of description, the direction T shown in FIG. 3 is referred as a thickness direction, and the thickness direction T is the direction in which the insulating base 10 is provided with the conductive layer 11 on surfaces of two opposite sides of the insulating base 10. That is, in this embodiment, two conductive layers 11 are disposed on two surfaces of the insulating base 10 opposite to each other along the thickness direction. The direction H is referred as a height direction, and the height direction H is a direction in which the first portion and the second portion are arranged opposite to each other, i.e., a direction in which the first portion and the second portion extend oppositely. The direction W shown in FIG. 4 is referred as a width direction, and the width direction W is a direction perpendicular to the thickness direction T and the height direction H.

As the embodiment shown in FIGS. 3-4, a portion of the insulating base 10 corresponding to the second portion is provided with a plurality of first through-holes 13a throughout the thickness direction, and the second portions on both sides are provided with a plurality of second through-holes 13c throughout the thickness direction. Each of the plurality of second through-holes 13c in each second portion is arranged corresponding to one of the plurality of first through-holes 13a, and communicates with the first through-hole 13. Since the second through-holes 13c and the first through-holes 13a are provided on the second portions and the corresponding portion of the insulating base 10 respectively and communicate with each other, one first through-holes 13a and two second-through-holes 13c can allow the entire thickness of the current guiding portion 13 to be penetrated. Since the current guiding portion 13 is provided with a plurality of sets of a first through-hole 13a and a second through-hole 13c, the plurality of sets of a first through-hole 13a and a second through-hole 13c penetrate the current guiding portion 13 in the thickness direction.

In order to form the first through-holes 13a and the second through-holes 13c, the first through-hole 13a can be formed by punching it on the portion of the insulating base 10 corresponding to the second portion before the conductive layer 11 is coated, and then the conductive layer 11 is coated on the insulating base 10 and the second through-holes 13c are respectively formed by punching them on both sides of the conductive layer 11. Alternatively, the first through-holes 13a and the second through-holes 13c can be formed at once by coating the conductive layer 11 on two sides of the insulating base 10 and then punching them along the thickness direction, so that the electrode member of this embodiment can be obtained by directly drilling through-holes in the current guiding portion 13 of the existing electrode member. In this manner, the process is simpler and costs lower.

The electrode assembly 100 that is formed based on the electrode members according to this embodiment is assembled with the current collecting member 200 by welding. As shown in FIG. 6, the electrode assembly 100 is welded to the current collecting member 200 via the second portion of the electrode member, and a welding portion 1a is formed between the second portion and the current collecting member 200.

Due to the first through-holes 13a, the conductive layers 11 located on both sides of the insulating base 10 melt and flow into the first through-holes 13a during the welding process, so that the first through-holes 13a also have the conductive material therein. Therefore, current paths are formed and the conductive layers 11 located on both sides of the insulating base 10 communicate with each other, so that the current can flow from the conductive layer 11 on one side to a conductive layer 11 on the other side via the first-through-holes 13a. In this way, the insulating effect of the insulation base 10 on the conductive layer 11 on both sides thereof can be reduced, the conductivity of the conductive layer 11 on both sides can be enhanced, and the current transferring of the current guiding portion 13 in the thickness direction is achieved, thereby improving the conducting efficiency. It can be seen that in this embodiment, the first through-holes 13 are provided on a portion of the insulating base 10 corresponding to the second portion of the conductive layer 11 where the active material is not coated, so that the second portions on surfaces of two opposite sides of the insulating base 10 in the thickness direction can be melted through the first through-holes 13a during welding, thereby forming a current path. Therefore, this can facilitate improving the conductivity of the conductive member.

Since the second through-holes 13c provided at the corresponding positions of the second portion cooperate with the first through-holes 13a to penetrate the entire thickness of the current guiding portion 13, it is possible to achieve the more efficient current transferring between two conductive layers 11 located on both sides, thereby further improving the conductivity of electrode members.

When the current guiding portion 13 is being welded, the heat generated by the welding is transferring to a portion of the insulating base 10 corresponding to the second portion. If there is no first through-hole 13a provided, the portion of the insulating base 10 corresponding to the second portion can be wrinkled due to the heating. However, the first through-holes 13a provided in this embodiment can function to release the stress that the insulating base 10 is subjected to during the welding process, thereby effectively preventing the insulating base 10 from being wrinkled by heat during the welding process.

In addition, providing the first through-hole 13a and the second through-hole 13c in communication with the first through-hole 13a enables the welding energy to penetrate the current guiding portion 13 more easily when the electrode member is being welded with the current collecting member 200, thereby improving the welding convenience, reducing welding difficulty, enhancing welding efficiency and saving energy. On the other hand, it possible to accomplish the welding of thicker members on basis of the approximately same welding energy. Especially, when the electrode member and the current collecting member 200 are connected by ultrasonic welding, the ultrasonic energy can efficiently penetrate the current guiding portion 13 through the first through-hole 13a and the corresponding second through-hole 13c, thereby achieving the ultrasonic welding of the electrode member and the current collecting member 200.

The electrode assembly 100 as shown in FIG. 5 can be formed by using the electrode member of this embodiment as a positive electrode member 103 and winding the electrode member together with a separator 102 and a negative electrode member 101. As shown in FIG. 5, the electrode assembly 100 includes a plurality of current guiding portions 13, and the plurality of current guiding portions 13 are stacked. The plurality of current guiding portions 13 stacked together form an electrode tab of the electrode assembly 100. In the thickness direction T, every two adjacent current guiding portions 13 of the electrode tab are electrically communicated with each other through the current path being formed by the second through-hole 13c of the conductive layer 11 on one side of the insulating base 10, the first through-hole 13a and the second through-hole 13c of the conductive layer 11 on the other side of the insulating base 10. Therefore, the adjacent current guiding portions 13 of the electrode tab are no longer blocked by the insulating base 10 from the current transferring. When the current generated by the current generating portion 14 is guided outwards, not only the outermost current guiding portions 13 of the electrode tab directly connected to the current collecting member 200 can transfer the current outwards through their own conductive layers 11, but also the electrical conduction between the current guiding portions 13 located between the outermost current guiding portions 13 of the electrode tab can be achieved through the formed current paths. In this way, the conductive property can be enhanced, thereby achieving the more efficient charging and discharging process.

In the electrode assembly 100 shown in FIG. 5, the positive electrode member 103 employs the electrode member according to this embodiment, and the negative electrode member 101 does not employ the electrode member according to this embodiment. However, it should be understood that, the negative electrode member 101 can adopt the electrode member according to this embodiment, while the positive electrode member 103 does not adopt the electrode member according to this embodiment; or the positive electrode member 103 and the negative electrode member 101 can both employ the electrode member according to this embodiment.

The electrode assembly 100 shown in FIG. 5 is assembled with the current collecting member 200, the case, the top cover 300, the electrode terminal 400, and the like of the rechargeable battery to form the rechargeable battery shown in FIG. 7. In this embodiment, the electrode assembly 100 and the current collecting member 200 are connected by welding (e.g., ultrasonic welding or resistance welding) to achieve the electrical connection between the electrode assembly 100 and the current collecting member 200.

Figure 9:
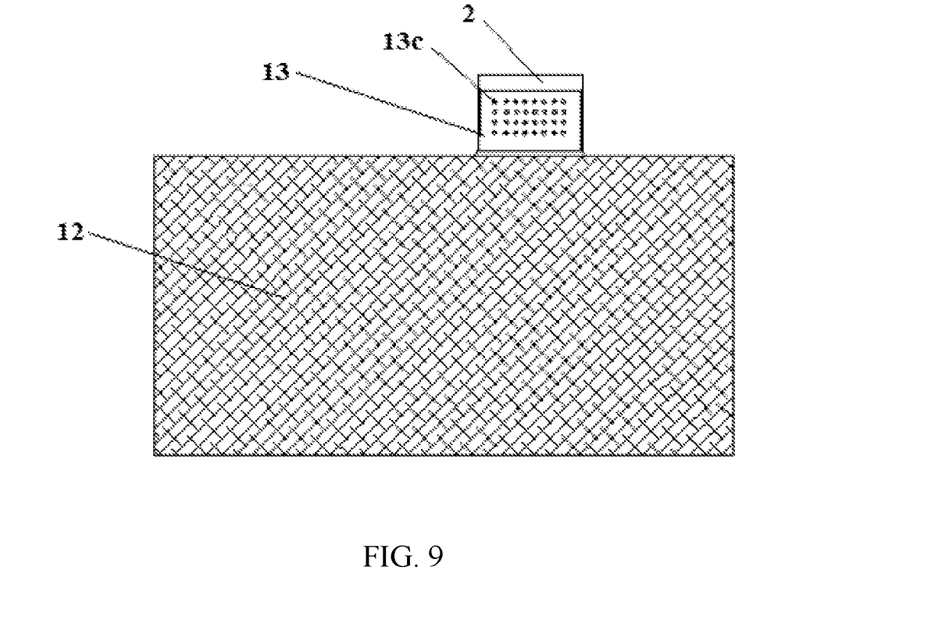
FIG. 9 illustrates a side view of FIG. 8.
Figure 10:
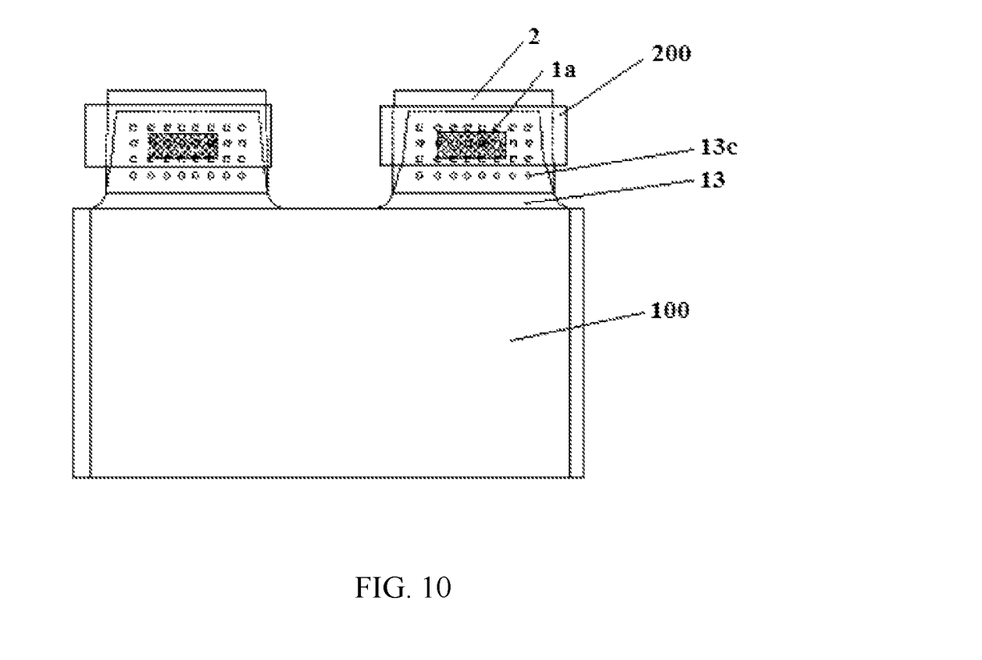
FIG. 10 illustrates a schematic view of welding the electrode assembly and the current collecting member shown in FIG. 8.

The second embodiment will be described below with reference to FIGS. 8-10. In order to simplify the description, the difference between the second embodiment and the first embodiment will mainly be described below, and the non-described parts can be understood with reference to the first embodiment.

Figure 8:
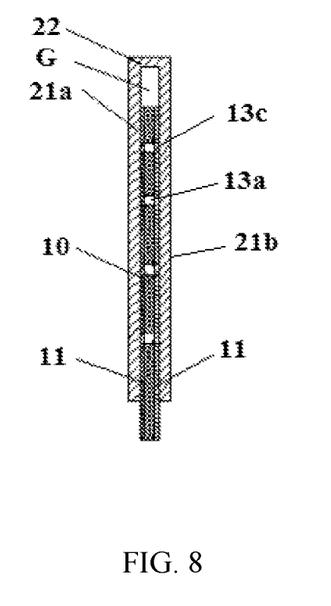
FIG. 8 illustrates a schematic structural view of an electrode member according to a second embodiment of the present invention.

As shown in FIG. 8, in the second embodiment, based on the through-holes (the first through-hole 13a and the second through-hole 13c) provided in the current guiding portion 13, a second portion is further provided with a conductive structure 2. The conductive structure 2 is connected to the second portion. In other words, the conductive structure 2 is connected to the conductive layer 11 of the current guiding portion 13. On basis of this, the electrode member can be no longer directly connected to the current collecting member 200 via the conductive layer 11, but connected to the current collecting member 200 via the conducting structure 2, thereby realizing the outward guiding of the current. In operation, the current can flow from the active material 12 to the second portion of the conductive layer 11 via the first portion of the conductive layer 11, and the second portion on both sides of the insulating base 10 can transfer current through the current path formed by the first through-hole 13a. In the meantime, the current can also flow from the second portion of the conductive layer 11 to the conductive structure 2 connected to the second portion. Then, the conductive structure 2 can guide current to the current collecting member 200 of the rechargeable battery connected to the conductive structure 2 and then the current is further led out the current collecting member 200, for example, to the electrode terminal 400 of the rechargeable battery. It can be seen that by additionally providing the conductive structure 2, the conductivity of the electrode member can be further improved, and the current-passing capability of the electrode member can be enhanced.

The conductive structure 2 can be made of a metal material, such as copper or aluminum. When the electrode member is used as a positive electrode member, the conductive structure 2 is preferably made of aluminum, and when the electrode member is used as a negative electrode member, the conductive structure 2 is preferably made of copper.

In this embodiment, the conductive structure 2 is arranged to cover the first through-hole 13a. Specifically, as shown in FIG. 8, the conductive structure 2 covers the first through-holes 13a and the second through-holes 13c on the conductive layers 11 on both sides of the insulating base 10. The advantage of this arrangement is in that the conductive structure 2 can contact the current path formed by the conductive layer 11 (specifically, the second portion) with the first through-hole 13a, so that the current transferred through the current path formed by the first through-hole 13a can be more efficiently transferred to the conductive structure 2 and then can be led out by the conductive structure 2, thereby resulting in the higher conductive efficiency.

In addition, as shown in FIG. 8, in this embodiment, the conductive structure 2 includes a first conductive member 21a and a second conductive member 21b. The first conductive member 21a and the second conductive member 21b are respectively disposed on the two sides of the current guiding portion 13 in the thickness direction, and connected to conductive layers 11 located on two sides of the insulating base 10 of the current guiding portion 13. That is, the first conductive member 21a is connected to the second portion on one surface of the insulating base 10, while the second conductive member 21b is connected to the second portion on the other surface of the insulating base 10.

Since the first conductive members 21a and second conductive members 21b are respectively provided on two sides of the current guiding portion 13 in the thickness direction, there is a current guiding structure 2 provided between any two adjacent current guiding portions 13 of the electrode tab of the electrode assembly 100 including this electrode member, and any two adjacent current guiding portions 13 can not only be electrically connected by the current path formed by the through-holes, but also by a first conductive member 21a on one current guiding portion 13 and a second conductive member 21b on the other current guiding portion 13. In this way, the current can be smoothly and sufficiently transferred between individual current guiding portions 13 of the electrode tab that are stacked together, and eventually the current generated by the electrode assembly 100 can be more efficiently transferred to the current collecting member 200. Since the conductive structure 2 can further prevent the adjacent current guiding portions 13 of the electrode tab from being isolated by the insulating base 10 and increase the current-passing area, the charging and discharging efficiency of the rechargeable battery can be more effectively improved, thereby reducing the risk of overheating rechargeable battery during charging and discharging. This can facilitate prolonging the service life of rechargeable battery.

Since both the first conductive member 21a and the second conductive member 21b according to this embodiment cover the second through-hole 13c and the first through-hole 13a penetrating the entire thickness of the current guiding portion 13, the first conductive member 21a and the second conductive member 21b can not only be respectively connected to the respective corresponding parts of conductive layer 11s (specifically, the second portions), but also can be connected to each other by passing through the second through-hole 13c and the first through-hole 13a, when the first conductive member 21a and the second conductive member 21b are welded to the current guiding portion 13. On the one hand, the first conductive members 21a and the second conductive members 21b provided on two opposite sides of the insulating base 10 can also realize the current transferring in the thickness direction through the current path and increase current transferring paths of the first conductive members 21a and the second conductive members 21b, thereby improving the electrical conductivity of the electrode member. On the other hand, the first conductive member 21a and the second conductive member 21b can be directly welded to each other at the position where the through-hole is provided in the current guiding portion 13. Compared with the case where the first conductive member 21a and the second conductive member 21b are only respectively welded to the thinner second portions, the welding strength of the first conductive member 21a and the second conductive member 21b can be further increased, and the structural reliability of the electrode member can be enhanced.

The first conductive member 21a and the second conductive member 21b according to this embodiment are respectively disposed on two opposite sides of the current guiding portion 13 in the thickness direction, so that a gap G, as shown in FIG. 8, is formed between the first conductive member 21a and the second conductive member 21b. As shown in FIG. 8, in this embodiment, the upper ends of the first conductive member 21a and the second conductive member 21b are both higher than the upper end of the electrical guiding portion 13, i.e., an edge of the conductive structure 2 away from the first portion extend beyond an edge of the second portion away from the first portion. In this way, the electrode body 1 (specifically, the current guiding portion 13) only fills part of the gap G between the first conductive member 21a and the second conductive member 21b.

Since the electrode body 1 only fills part of the gap G between the first conductive member 21a and the second conductive member 21b, at least part of the gap between the first electrode member 21a and the second electrode member 21b in the height direction H is not separated by the insulating base 10. On the one hand, this is advantageous in that the conductive layer 11s located on surfaces of two opposite sides of the insulating base 10 in the thickness direction T is electrically conducted by the first electrode member 21a and the second electrode member 21b, facilitating the lead-out of the current and improving electrical conductivity. On the other hand, when the electrode assembly 100 formed by the electrode members is connected to the current collecting member 200 of the rechargeable battery, the gap G can be conveniently reduced by compressing the first conductive member 21a and the second conductive member 21b, so that the first conductive member 21a and the second conductive member 21b can be more tightly attached. In this way, the electrode tab can transfer the current from the current guiding portions 13 stacked together to the current collecting member 200, thereby further enhancing the conductive property. Moreover, this can also reduce the required space for assembling the electrode tab, enhance the space utilization, and reduce the assembling difficulty of the electrode assembly 100 and the current collecting member 200.

As shown in FIG. 8, the conductive structure 2 according to this embodiment further includes a conductive connecting portion 22, which is connected between the first conductive member 21a and the second conductive member 21b. Specifically, as shown in FIG. 3, the lower ends of the first conductive member 21a and the second conductive member 21b are respectively connected to the second portion located on two opposite sides of the insulating base 10 in the thickness direction, and the upper ends of the first conductive member 21a and the second conductive 21b are connected to each other via the conductive connecting portion 22, so that the conductive structure 2 is connected to the current guiding portion 13 in an inverted U-shape.

By providing the conductive connecting portion 22, the first conductive member 21a and the second conductive member 21b can be integrally connected. Even the first conductive member 21a and the second conductive member 21b are not compressed, the current still can be transferred between the first conductive member 21a and the second conductive member 21b. Therefore, the adjacent current guiding portions 13, which are stacked together after the electrode assembly 100 is formed, can be electrically conducted with each other without being affected by the insulating base 10, thereby further improving the conductive property of the electrode tab.

It should be noted that, in addition to that the first conductive member 21a and the second conductive member 21b are integrally connected by the conductive connecting portion 22, the first conductive member 21a and the second conductive member 21b can be directly connected as a whole. That is, the end of the first conductive member 21a away from the first portion (i.e., the upper end shown in FIG. 8) and the end of the second conductive member 21b away from the first portion (i.e., the upper end shown in FIG. 8) can be directly connected to each other. For example, a copper foil or aluminum foil can be used as the conductive structure 2, and the copper foil or the aluminum foil can be bent in the middle and then connected to the conductive layers 11 located on the two opposite sides of the current guiding portions 13. In this case, two parts of the copper foil or the aluminum foil that are formed by bending are the first conductive member 21a and the second conductive member 21b respectively. In this case, the first conductive member 21a and the second conductive member 21b are directly connected in an inverted V shape, so that the conductive structure 2 is connected to the current guiding portion 13 in an approximately inverted V-shape.

As shown in FIG. 5, the electrode assembly 100 formed based on the electrode member according to this embodiment has a plurality of current guiding portions 13 and a plurality of conductive structures 2. The plurality of current guiding portions 13 are arranged in a stack, and every two adjacent electric guiding portions 13 have a conductive structure 2 therebetween. Based on this, the adjacent current guiding portions 13 of the electrode tab can be further electrically conducted through the conductive structure 2, so that not only the outermost current guiding portions 13 of the electrode tab that are directly connected to the current collecting member 200 can lead out the electric current through their own conductive structure 2, but also the current guiding portions 13 located between the outermost current guiding portions 13 of the electrode tab can lead out the current through their own conductive structure 2, when the electric current generated by the current generating portion 14 is led out. Therefore, the electric conductivity can be enhanced, achieving the more efficient charging and discharging process.

The electrode assembly 100 formed based on the electrode member according to this embodiment also can be connected to the current collecting member 200 by welding. The electrode assembly 100 can be welded to the current collecting member 200 via the conductive structure 2 of the electrode member. During welding, the conductive structure 2 can be firstly welded to the second portion, and then the current collecting member 200 can be welded to the conductive structure 2. That is, connection between the electrode assembly 100 and the current collecting member 200 can be implemented by the two-times welding method. However, as mentioned in the first embodiment, the welding energy can easily penetrate the current guiding portion 13 by providing through-holes on the current guiding portion, i.e., it is possible to weld thicker members with the approximately same welding energy. Therefore, the one-time welding method can be used in this embodiment, instead of the two-times welding method. That is, the welding connection between the current collecting member 200 and the conductive structure 2 and the welding connection between the conductive structure 2 and the second portion can be completed at one time. It can be seen that, the through-hole provided on the current guiding portion 13 can achieve the connection between the current collecting member 200 and the conductive structure 2 and the connection between the conductive structure 2 and the second portion in one time welding. Compared with the two-times welding method, the one-time welding method can involve the fewer steps, the simpler process and the higher efficiency, and the electrode tab is bendable, so that the connection to the current collecting member 200 is convenient after the electrode tab is bent, and the space for bending the electrode tab can be saved and the energy density can be increased.

It should be noted that the conductive structure 2 is not limited to the structure shown in FIG. 8, and only several variations thereof are described herein.

As a variation of the conductive structure 2 shown in FIG. 8, the conductive structure 2 can directly omit the conductive connecting portion 22. That is, the upper end of the first conductive element 21a and the upper end of the second conductive element 21b can be connected no longer by the conductive connecting portion 22, but can be independent of each other and become free ends. The advantage of this arrangement is in that, since the conductive connecting portion 22 is omitted and thus the first conductive member 21a and the second conductive member 21b are no longer supported by the conductive connecting portion 22, the first conductive member 21a and the second conductive member 21b can be closer under the external force. Therefore, it is possible that the first conductive member 21a and the second conductive member 21b of each conductive structure 2 can be more tightly compressed when connecting the electrode assembly 100 to the current collecting member 200, and the gap G between the conductive member 21a and the second conductive member 21b can be effectively eliminated. In this way, the conductive efficiency can be further improved and the installation space can be decreased, so that the electrode assembly 100 and the current collecting member 200 can be assembled more effectively.

As another variation of the conductive structure 2 shown in FIG. 8, in the height direction H, the electrode body 1 (specifically, the current guiding portion 13) can fill not only part of the gap G between the first conductive member 21a and the second conductive member 21b, but can fill the all of the gap G. In this way, the electrode body 1 can support the all of the first conductive members 21a and the second conductive members 21b in the height direction H, thereby more effectively preventing the first conductive members 21a and the second conductive members 21b from being bent. On the one hand, the strength of the electrode member can be increased. On the other hand, the safety of use can also be further improved, since the first conductive member 21a and the second conductive member 21b can be prevented from being bent and inserted into the electrode assembly 100 during use and thus a short circuit is avoided.

As still another variation of the conductive structure 2 shown in FIG. 8, the conductive structure 2 can no longer include the first conductive member 21a, the second conductive member 21b and the conductive connecting portion 22 at the same time, but can omit the second conductive member 21b and the conductive connecting portion 22, i.e., the conductive structure 2 only includes the first conductive member 21a. That is, the conductive structure 2 is no longer provided with conductive members located on the second portions of the both opposite sides of the insulating base 10 in the thickness direction, but the conductive member is only provided on the second portion of one side of the insulating base 10 in the thickness direction. In addition, when a plurality of electrode members having such conductive structure is wound to form the electrode assembly 100, the first conductive members 21a of the plurality of electrode members are disposed on the second portion of the same side of the insulating base 10 in the thickness direction. Referring to FIG. 5, every two adjacent current guiding portions 13 of the current guiding portions 13 stacked together still have the conductive structure 2 (specifically, the first conductive member 21a) therebetween, and the conductive layer 11 located on the side where no first conductive member 21a of the current guiding portion 13 is disposed can be brought into contact with a first conductive member 21a of another adjacent current guiding portion 13, thereby achieving the electrical conduction between any two adjacent current guiding portions 13 of the electrode tab. In this case, each of the current guiding portions 13 has the first conductive members 21a on both sides of the current guiding portion 13 in the thickness direction (on one side is its own first conductive member 21a, and on the other side is the first conductive member 21a of the adjacent current guiding portion 13). Therefore, when welting the electrode tab, the first conductive members 21a located on both sides of each current guiding portion 13 in the thickness direction can also be connected to each other through through-holes in the current guiding portion 13, which can not only improve the electrical conductivity of the electrode assembly but also enhance the structural reliability of the electrode assembly. Moreover, since the second conductive member 21b and the conductive connecting portion 22 are omitted, it is possible to effectively reduce the size of the conductive structure 2 in the thickness direction T while providing a sufficient current-passing, thereby further reducing the required space for assembling the electrode tab and thus reducing the assembly difficulty of the electrode assembly 100 and other structural components of the rechargeable battery.

In addition, in above embodiments, the current path not only can be formed in the through-hole by welding the current guiding portion 13, the current collecting component 200, the conductive structure 2, and the like, but also can be formed in the through-hole in other ways. For example, a conductive medium can be provided directly in the first through-hole 13a, and the current can be transferred in the thickness direction T by means of the conductive medium filled in the first through-hole 13a. Alternatively, the current guiding portion 13 can be connected to the current collecting member 200, the conductive structure 2, or the like through a metal member, such as a threaded connector adapted to the through-hole, and the metal member, while being inserted into the through-hole, can also transfer the current along the thickness direction.

In addition, in the above embodiments, the thickness of the second portion, the diameter of the first through-hole 13a, and the thickness of the conductive structure 2 can also be designed to improve the overall performance of the electrode member. The thickness of the second portion can range from 1 nm to 2 µm. Preferably, the thickness of the second portion can range from 500 nm to 1000 nm. Within this range of thickness, it is more difficult to produce burr in the second portion in the nail penetration test, and the second portion has the lower resistance and the higher electrical conductivity. The diameter of the first through-hole 13a can range from 10 nm to 1000 µm. Preferably, the diameter of the first through-hole 13a can range from 25 nm to 800 nm. Within this range of diameter, the welding energy can penetrate well, and the insulating base 10 still has the high strength. The thickness of the conductive structure 2 can range from 5 µm to 20 µm. Preferably, the thickness of the conductive structure 2 can range from 6 µm to 10 µm. Within this range of thickness, the conductive structure 2 has good conductivity and the thickness of the current guiding portion 13 does not excessively increase, thereby ensuring the energy density of the electrode assembly 100.

The above embodiments of the present invention are only exemplary embodiments that are not intended to limit the present invention. Without departing from spirit and principles of the present invention, any modifications, equivalent substitutions, improvements and the like should be included in the protection scope of the invention.

What is claimed is:

1. An electrode assembly, comprising a plurality of electrode members,
   each of the plurality of electrode members comprising:
   an electrode body, wherein the electrode body comprises an insulating base and a conductive layer disposed on each of two opposite surfaces of the insulating base, the conductive layer has a first portion and a second portion extending from the first portion, the first portion is adapted to be coated with an active material and the second portion is uncoated with the active material, and a portion of the insulating base corresponding to the second portion is provided with a first through-hole throughout a thickness direction; and
   a conductive structure, wherein the conductive structure comprises a first conductive member and a second conductive member, the first conductive member is connected to the second portion located on a surface of the insulating base, and the second conductive member is connected to the second portion located on the other surface of the insulating base, wherein a portion of the insulating base corresponding to the second portion and the second portion form one current guide portion, a plurality of current guide portions of the plurality of electrode members is stacked, and the first conductive member and the second conductive member are arranged between every two adjacent guide portions of the plurality of current guide portions.

2. The electrode assembly according to claim 1, wherein the first through-hole is filled with a conductive medium.

3. The electrode assembly according to claim 1, wherein there are at least two first through-holes provided, which are arranged in rows and/or in columns.

4. The electrode assembly according to claim 1, wherein the second portion has a thickness in a range of 1 nm-2 μm.

5. The electrode assembly according to claim 1, wherein the first through-hole has a diameter in a range of 10 nm-1000 μm.

6. The electrode assembly according to claim 1, wherein the second portion is provided with a second-through hole throughout the thickness direction, and the second-through hole is arranged corresponding to the first through-hole and communicates with the first through-hole.

7. The electrode assembly according to claim 1, wherein the conductive structure covers the first through-hole.

8. The electrode assembly according to claim 1, wherein the conductive structure is welded with the second portion.

9. The electrode assembly according to claim 1, wherein the conductive structure has a thickness in a range of 5-20 μm.

10. A rechargeable battery, comprising a current collecting member, wherein the rechargeable battery further comprises the electrode assembly according to claim 1, and the second portion is electrically connected to the current collecting member.

11. The rechargeable battery according to claim 10, wherein the second portion is welded with the current collecting member.

12. An electrode assembly, comprising an electrode member, the electrode member comprising:

an electrode body, wherein the electrode body comprises an insulating base and a conductive layer disposed on each of two opposite surfaces of the insulating base, the conductive layer has a first portion and a second portion extending from the first portion, the first portion is adapted to be coated with an active material and the second portion is uncoated with the active material, and a portion of the insulating base corresponding to the second portion is provided with a first through-hole throughout a thickness direction; and a plurality of conductive structures, wherein each of the plurality of conductive structures comprises a first conductive member and a second conductive member, the first conductive member is connected to the second portion located on a surface of the insulating base, and the second conductive member is connected to the second portion located on the other surface of the insulating base, wherein the electrode member is wound in such a manner that a portion of the insulating base corresponding to the second portion and the second portion form a plurality of current guide portions that is stacked, and the first conductive member of one of the plurality of conductive structures and the first conductive member or the second conductive member of another conductive structure of the plurality of conductive structures are arranged between every two adjacent guide portions of the plurality of current guide portions.

13. The electrode assembly according to claim 12, wherein the first through-hole is filled with a conductive medium.

14. The electrode assembly according to claim 12, wherein there are at least two first through-holes provided, which are in rows and/or in columns.

15. The electrode assembly according to claim 12, wherein the first through-hole has a diameter in a range of 10 nm-1000 μm.

16. The electrode assembly according to claim 12, wherein the second portion is provided with a second-through hole throughout the thickness direction, and the second-through hole is arranged corresponding to the first through-hole and communicates with the first through-hole.

17. The electrode assembly according to claim 12, wherein the plurality of conductive structures covers the first through-hole.

18. The electrode assembly according to claim 12, wherein the plurality of conductive structures is welded with the second portion.

19. The electrode assembly according to claim 12, wherein the plurality of conductive structures has a thickness in a range of 5-20 μm.

20. A rechargeable battery, comprising a current collecting member, wherein the rechargeable battery further comprises the electrode assembly according to claim 12, and the second portion is electrically connected to the current collecting member.

* * * * *